US011713991B2

(12) United States Patent
Whitehead et al.

(10) Patent No.: US 11,713,991 B2
(45) Date of Patent: Aug. 1, 2023

(54) DROP TEST MEASURING SYSTEM AND METHOD(S) OF USE THEREOF

(71) Applicants: Norman C. Whitehead, Crested Butte, CO (US); Clarence L. Boggs, Wise, VA (US)

(72) Inventors: Norman C. Whitehead, Crested Butte, CO (US); Clarence L. Boggs, Wise, VA (US)

( * ) Notice: Subject to any disclaimer, the term of this patent is extended or adjusted under 35 U.S.C. 154(b) by 780 days.

(21) Appl. No.: 16/846,359

(22) Filed: Apr. 12, 2020

(65) Prior Publication Data

US 2020/0326219 A1 Oct. 15, 2020

Related U.S. Application Data

(60) Provisional application No. 62/833,579, filed on Apr. 12, 2019.

(51) Int. Cl.
| | | |
|---|---|---|
| *G01N 15/08* | (2006.01) | |
| *G01F 1/74* | (2006.01) | |
| *G01F 1/36* | (2006.01) | |
| *G01F 1/66* | (2022.01) | |
| *C02F 1/00* | (2023.01) | |

(52) U.S. Cl.
CPC ............... *G01F 1/74* (2013.01); *G01F 1/363* (2013.01); *G01F 1/662* (2013.01); *C02F 1/001* (2013.01)

(58) Field of Classification Search
CPC . G01F 1/007; G01F 1/34; G01F 22/02; G01F 23/14; G01N 2015/084
See application file for complete search history.

(56) References Cited

U.S. PATENT DOCUMENTS

| | | | | |
|---|---|---|---|---|
| 2,858,024 A | * | 10/1958 | Babcock | B01D 24/40 210/108 |
| 4,187,175 A | * | 2/1980 | Roberts | B01D 24/4884 210/275 |
| 6,159,384 A | * | 12/2000 | Roberts | C02F 3/104 210/275 |
| 7,754,089 B2 | * | 7/2010 | Roberts | B01D 24/4861 210/275 |
| 2007/0084283 A1 | * | 4/2007 | Carlson | H04Q 9/00 73/290 V |
| 2019/0275448 A1 | * | 9/2019 | Romers | B01D 24/4631 |

* cited by examiner

*Primary Examiner* — Alexander A Mercado
(74) *Attorney, Agent, or Firm* — Leyendecker & Lemire, LLC

(57) ABSTRACT

A drop test measuring system and method of use is described. Embodiments of the drop test measuring system can include, but is not limited to, a control module, a liquid level measuring device, and a remotely located smart device. The liquid level measuring device can be implemented to take measurements that can allow a smart device to calculate a liquid level based on the measurements in addition to other known parameters. Typically, the drop test measuring system can be implemented in a water treatment facility implementing a filter medium.

20 Claims, 4 Drawing Sheets

DROP TEST MEASURING SYSTEM AND METHOD(S) OF USE THEREOF

CROSS-REFERENCE TO RELATED APPLICATION

This application claims the benefit of U.S. Provisional Application No. 62/833,579, filed Apr. 12, 2019.

BACKGROUND

A drop test for measuring flow rate in a filter medium (e.g., sand filter) requires the measurement of the time that it takes a surface of a bodied water to drop over a required distance so that a flow rate through the sand filter can be determined and then be compared with the sand filter operating requirements.

Currently, the standard test is done by placing two horizontal nails, or rod like objects, through a board with the tip of one nail six inches vertically above the other or by using a tape measure, ruler, or staff gage and then measuring the time that it takes for the water level to drop from one nail tip to the other nail tip or a given distance. The results of the test are then used to calculate the velocity of the water through the sand filter to determine if the filter is functioning within the design requirements for the filter.

The drawbacks of performing the test with the above method is the reliance of human judgment in measuring the distance between the nail tips, the judgment of when the water level is at the tip of each nail, or a point on a staff gage, and the reaction time of starting or stopping the timer device at the beginning and end of the test at those points. Other drawbacks of the above method are the recording of the data, calculating the flow rate, and filing or storing the data and results of the test.

Therefore, there is a need for a novel device in this field that would (i) improve an accuracy of the test, (ii) make the testing apparatus portable, (iii) store filter basin dimensions, (iv) store test parameters, (v) measure water level drop, (vi) calculate flow velocities and rates, (vii) store test results electronically, (viii) store user and plant information electronically, (ix) display running test information on a computer or mobile device, and (x) create a report of the test information.

DETAILED DESCRIPTION

Figure 1A:
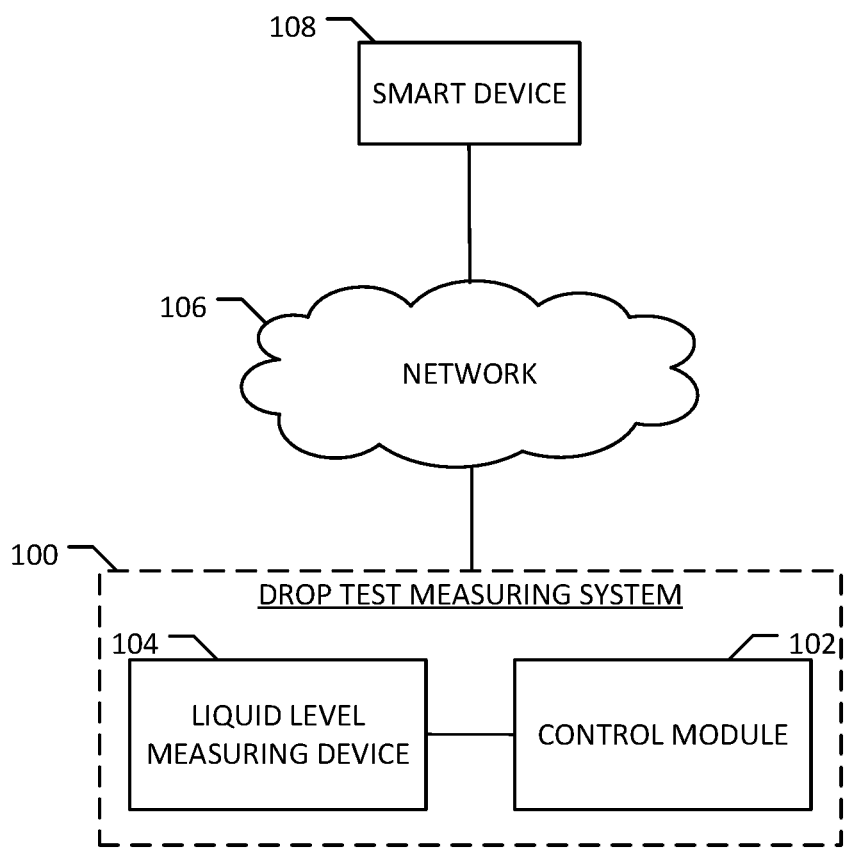
FIG. 1A is a block diagram of a drop test measuring system according to one embodiment of the present invention.

Embodiments of the present invention include a drop test measuring system and a method(s) of use thereof. The drop test measuring system can be implemented to determine a flow rate of a liquid passing through a filter medium (e.g., sand filter). The drop test measuring system can include one or more components that can typically be placed in a basin having a sand filter at a water treatment facility. For instance, a liquid level measuring device of the system can be placed in the basin upstream of a sand filter. The liquid level measuring device can take measurements that can be used to calculate a depth of a liquid in the basin. An inflow of liquid into the basin can be stopped and as the liquid passes through the sand filter and exits the basin, the depth of the liquid can be reduced and a flow rate of the liquid through the sand filter can be calculated using information from the liquid level measuring device in addition to other information. It is to be appreciated that other information about the liquid passing through the sand filter can be calculated based on information obtained by the drop test measuring system.

In one embodiment, the drop test measuring system can include, but is not limited to, a liquid level measuring device and a control module. The control module can be implemented to receive a signal from the liquid level measuring device and convert the signal to a digital signal. The digital signal can include data from the liquid level measuring device and a timestamp of when the signal from the liquid level measuring device was received by the control module. The data can be sent from the drop test measuring system to a smart device via a network for use by a worker at a water treatment facility. The remotely located smart device can be configured to calculate a flow rate of a liquid through the sand filter based on data received from the drop test measuring system. In some embodiments, the control module can be part of the smart device.

Typically, the control module can send data and/or information to the smart device via a network. The information may then be presented to a user via the smart device after being processed. Test information can include a water treatment plant name, a tester's name, a filter name, date and time, and the test results.

The liquid level measuring device can include submersible and/or non-submersible pressure transducers (e.g., a pressure transmitter), an ultrasonic level transmitter, and a resistive level measuring device. In one embodiment, the liquid level measuring device can comprise a pressure transducer. It is to be appreciated that other means for measuring a liquid level are contemplated and not outside a scope of the present invention. The pressure transducer can typically be placed inside a basin upstream of a sand filter in a water treatment facility and can be operatively connected to the control module. The liquid level measuring device can be implemented to continuously measure a pressure in the basin which can be used to calculate a liquid level in the basin. The pressure measurements can be continuously sent to the control module which may convert the signal received from the liquid level measuring device into data including additional information about the measured pressure. The control module can send a digital signal including the data to the remotely located smart device. In one embodiment, time and/or distance intervals can be preset with the liquid level measuring device such that the component can take measurements at the preset intervals. As can be appreciated, the smart device can be provided the preset intervals such that the smart device can determine a flow rate from a difference in liquid level between two measurements since the intervals are known.

In another embodiment, the liquid level measuring device can continuously send pressure data to the control module and the control module can store the data. The control module can then convert the data into a digital signal and send the data to the smart device. The smart device can use the data to determine a flow rate of a liquid through the sand filter. For instance, the control module can time stamp each data signal sent such that each pressure measurement is associated with a time and then a difference in time can be used in conjunction with a difference in liquid level to determine the flow rate of a liquid flowing through the sand filter.

In one example method of use, the drop test measuring system can be implemented to help calculate a flow rate of a liquid through a sand filter at a water treatment facility. The drop test measuring system can be used to continuously monitor a flow rate of a liquid passing through the sand filter. In the hereinafter described example, a submersible pressure transducer is being implemented. Typically, the steps can be the same for other liquid level measuring devices, however, depending on the type, they may be installed at different locations relative to the liquid in the basin.

In a first step, the liquid level measuring device can be installed in a basin proximate an upper section of a typical sand filter. Of note, in a typical sand filter, liquid is passed down through various grain sizes of sand. The flow rate of a liquid passing through the sand filter is an important piece of information to ensure the sand filter is working within predefined parameters. Of note, after the liquid level measuring device has been installed, the basin can be filled with a liquid to be filtered. Once the supply of liquid to the basin is stopped, the process can move to the next step.

In a second step, the liquid level measuring device can be powered on and can start to transmit data to the control module. As previously mentioned, the control module may be part of the same device with the liquid level measuring device or the control module may be operatively connected to the liquid level measuring device. In either instance, data readings from the liquid level measuring device can be sent to the control module.

In a third step, the control module can receive an electrical signal from the liquid level measuring device. The control module may convert the electrical signal to data and associate a time stamp with the data of when the electrical signal was received. Of note, a smart device can use said data to calculate a flow rate of a liquid flowing through the sand filter. In some embodiments, the control module can be preprogrammed with information about the water treatment facility, the sand filter, basin dimensions, and any other information known. The control module may include that information in the data sent to the remotely located smart device to help the smart device calculate a flow rate. In other embodiments, the remotely located smart device can include information about a particular water treatment facility, basin dimensions, and information about the sand filter being used.

In a fourth step, the control module can send the processed data to a smart device for consumption by a worker at the water treatment facility.

In one example embodiment, a method of implementing a drop test measuring system at a water treatment facility implementing a sand filter in a basin can include, but is not limited to the following steps. First, a drop test measuring system can be provided to the water treatment facility. The system can consist of a control module and a liquid level measuring device. The liquid level measuring device can be operatively connected to the control module and can include a pressure transducer. Second, the liquid level measuring device can be placed (or installed) in the basin at a location proximate to a top of the sand filter and can be upstream of a gravity flow of a liquid through the sand filter. Third, a continuous electrical signal can be sent from the pressure transducer to the control module. The electrical signal can be related to a pressure measurement. Fourth, the electrical signal can be converted to data by the control module and can include a timestamp each time the date is stored. The data can include information related to a pressure measurement and a timestamp indicating the time the electrical signal was received by the control module. Fifth, a digital signal including the data can be continuously sent to a remotely located smart device. Each of the successive digital signals can include information about recently received pressure measurements. Lastly, a current flow rate can be continuously calculated based partially on (i) a first liquid level based on a pressure measurement having an earlier timestamp, (ii) a successive liquid level based on a pressure measurement having a later timestamp, and (iii) a difference in time between the earlier timestamp and the later timestamp.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

An Embodiment of a Drop Test Measuring System

Referring to FIGS. 1A, a block diagram of an embodiment 100 of a drop test measuring system is illustrated. The drop test measuring system 100 can typically be implemented in a water treatment facility, and more specifically, to measure a flow rate of a liquid passing through a filter medium of the water treatment facility. Embodiments of the drop test measuring system 100 can be implemented to accurately measure a flow rate of liquids being passed through the filter medium. Data and information related to the flow rate can be stored for later use by workers at the water treatment facility.

As shown, the drop test measuring system 100 can include, but is not limited to, a control module 102 and a liquid level measuring device 104. The drop test measuring system 100 can be connected to a remotely located smart device 108 via a network 106.

The control module 102 can be operatively connected to the liquid level measuring device 104. The liquid level measuring device 104 can be selected from the group of a submersible pressure transducer, a non-submersible pressure transducer, an ultrasonic level transmitter, and a resistive level measuring device. Depending on the type of liquid level measuring device 104 implemented, the liquid level measuring device 104 may be located at different locations in relation to a liquid in a basin. For instance, a submersible pressure transducer can be installed proximate a top of a filter medium inside the basin and can be submerged in a liquid. An ultrasonic level transmitter may be located above a top of the liquid and may not be submerged.

Figure 1B:
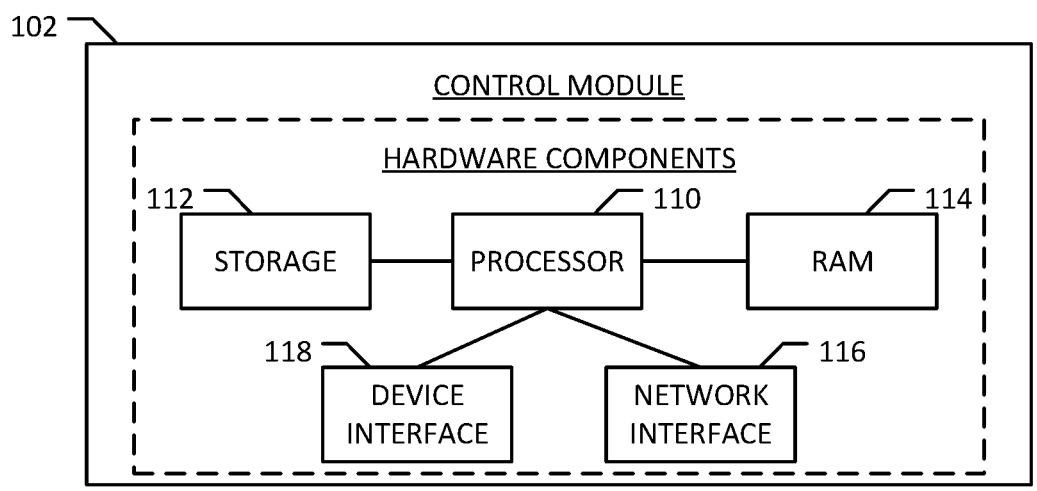
FIG. 1B is a block diagram of a control module according to one embodiment of the present invention.

Referring to FIG. 1B, a block diagram of one embodiment of the control module 102 is illustrated. The control module can include a processor 110, nonvolatile storage 112, random-access memory 114, a network interface 116, and a device interface 118. The processor 110 can be a single microprocessor, multi-core processor, or a group of processors. The random-access memory 114 can store executable code as well as data that can be immediately accessible to the processor 110. The nonvolatile storage 112 can store executable code and data in a persistent state. The network interface 116 can be implemented to connect to the network 106. The device interface 118 can be implemented to operatively connect the liquid level measuring device 104 to the control module 102.

In some embodiments, the liquid level measuring device 104 and the control module 102 can be combined into a single device. In such an embodiment, the control module 102 can receive a signal from the liquid level measuring device 104, process the data, and output a signal via the network interface 116 to another device. In another embodiment, the liquid level measuring device 104 can include a network adapter to wirelessly output a signal to the control module 102. In such an embodiment, the control module 102 can typically be part of a smart device or a computing device. For instance, the control module 102 can be a smart phone, a tablet, a laptop computing device, etc. In one embodiment, the liquid level measuring device 104 can be operatively connected to the control module 102 via a hardwire connection.

The smart device 108 can be any type of computing device on which a browser or software can operate. Examples of such devices can include, but are not limited to, desktop computers, laptop computers, tablet computers, mobile telephones, game consoles, network appliances, any other web-enabled devices, a personal computer, a smartphone, a netbook computer, or other computing devices.

An application configured to store, analyze, and present graphical representations (or displays) from information received from the control module 102 can be implemented in conjunction with the drop test measuring system 100. The graphical representations can include, but are not limited to, tables, charts, graphs, plots, etc. Typically, the application can be adapted to run on smart devices, tablets, laptops, etc. For instance, the application may run on the smart device 108. In some instances, a user may access the application via a web browser. The application can include a user interface to allow a user to interact with data related to one or more drop test measurement systems 100 located in different basins of a water treatment facility. The application can be configured to store information related to a basin and filter medium (e.g., a sand filter) being used in said basin. Data received from the drop test measuring system 100 can be associated with a basin where the system 100 is located. The application can then be used to calculate various data including, but not limited to, flow rate and flow velocity of a liquid located in the basin. The application may further store information about a particular filter medium. For instance, upper and lower boundaries for acceptable flow rates and/or flow velocity of a liquid passing through the filter medium can be stored. As can be appreciated, maintenance for the filter medium can based on determining if the calculated flow rate is within the upper and lower boundaries for a particular filter medium. The application can be implemented to store filter basin dimensions, liquid storage capacity of the basin, test parameters, measure water level drop based on data received from the control module 102, calculate flow velocities and rates, store test results, store user and water treatment facility information, generate a graphical display of running test information, and create a report of the test information.

Figure 2A:
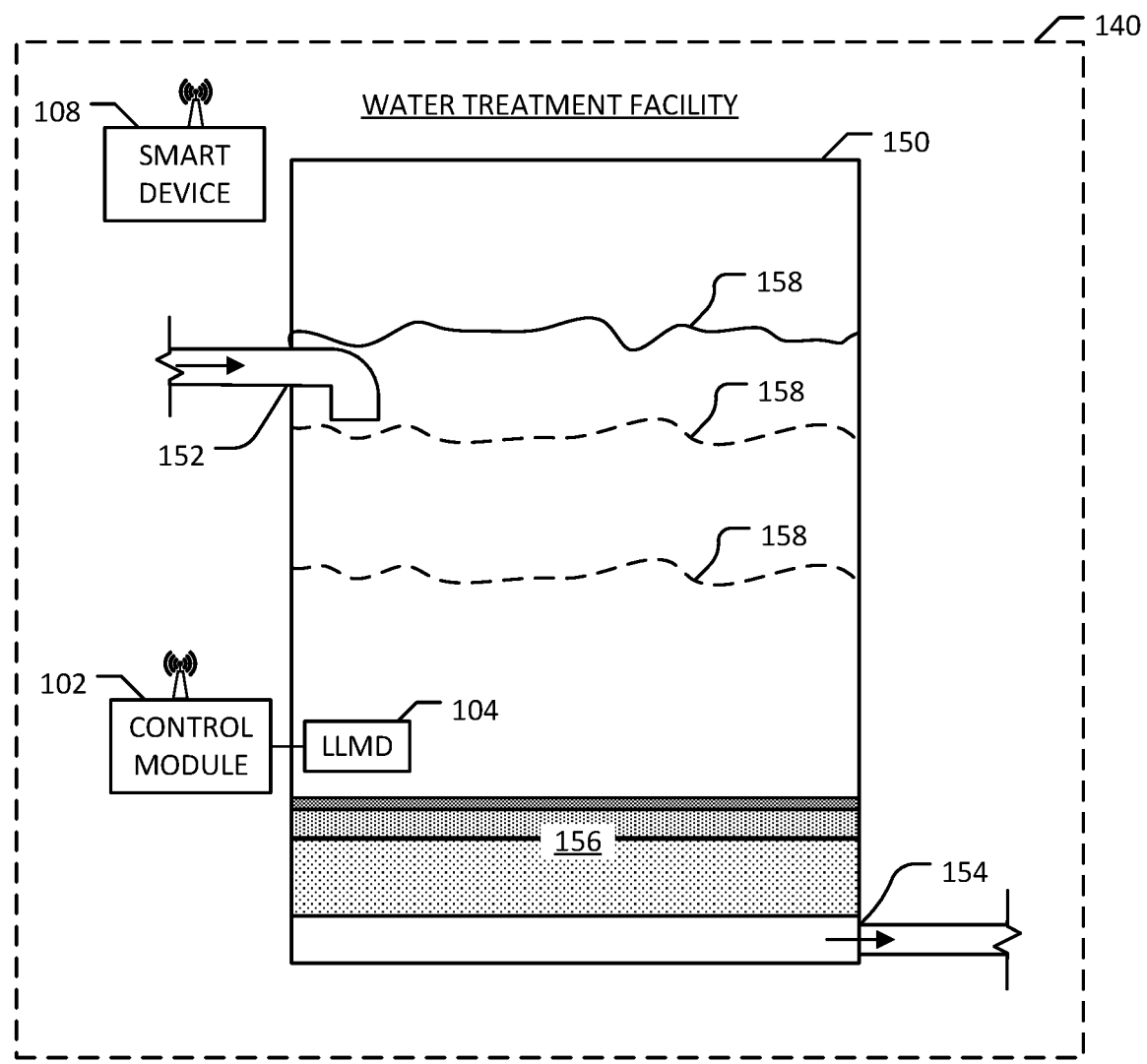
FIG. 2A is a graphical representation of a drop test measuring system implemented in a water treatment facility using a filter medium according to one embodiment of the present invention.
Figure 2B:
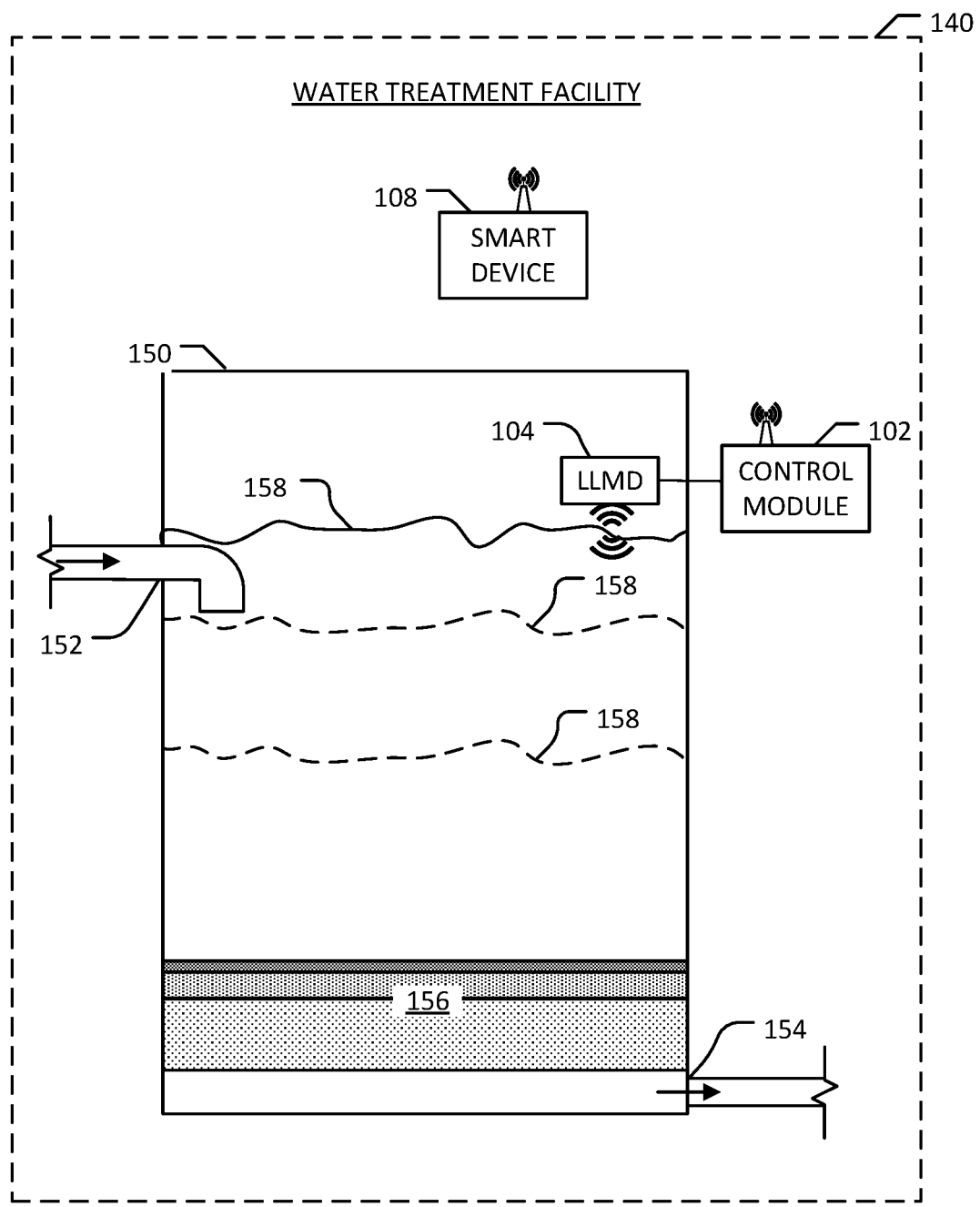
FIG. 2B is a graphical representation of a drop test measuring system implemented in a water treatment facility using a filter medium according to one embodiment of the present invention.
Figure 2C:
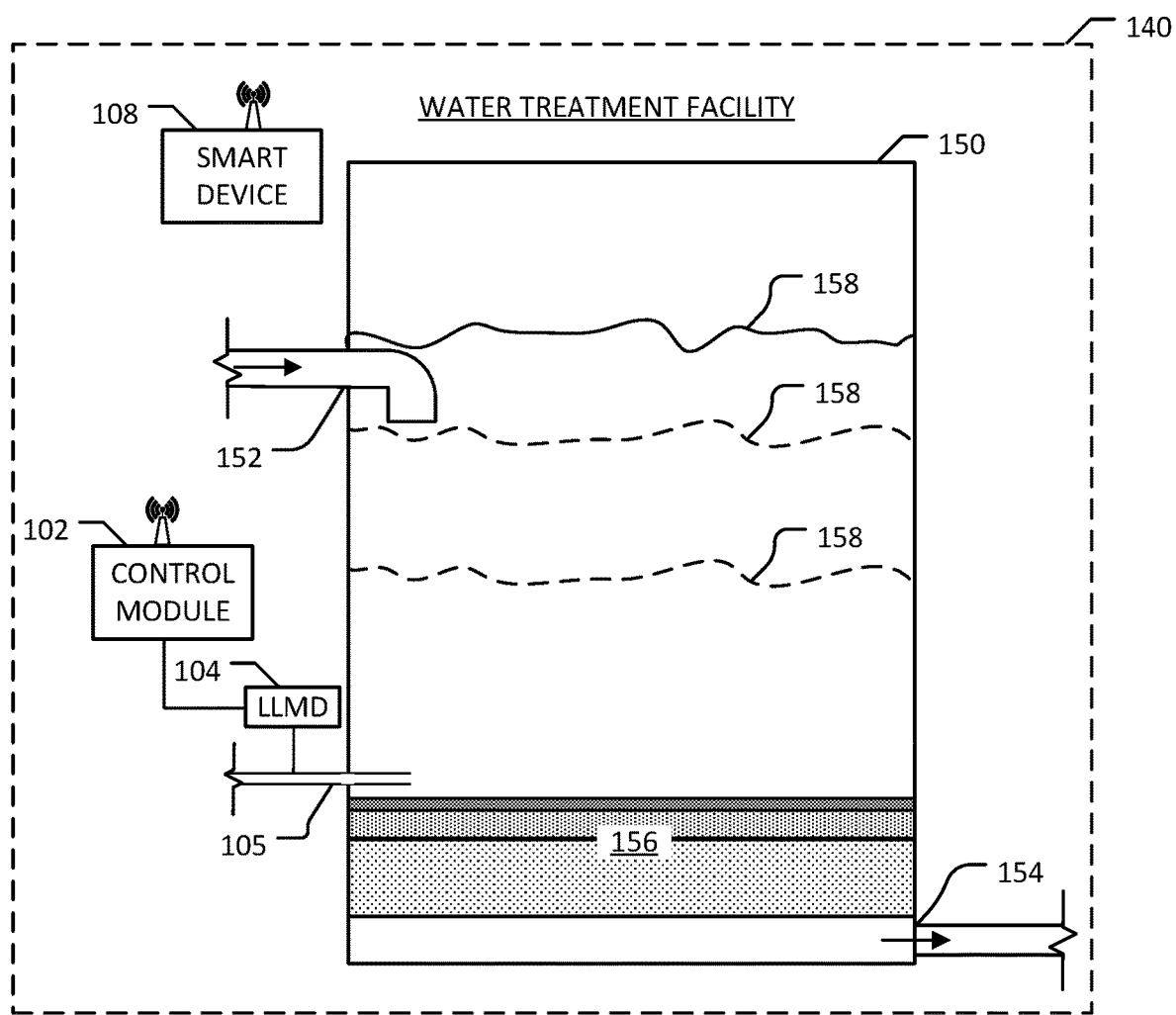
FIG. 2C is a graphical representation of a drop test measuring system implemented in a water treatment facility using a filter medium according to one embodiment of the present invention.

Referring to generally to FIGS. 2A-2C, illustrative diagrams of different embodiments of the drop test measuring system 100 being implemented at a water treatment facility 140 are illustrated. In a simplified form, the water treatment facility may include a basin 150 where a filter medium 156 (e.g., sand filter) may be stored and a liquid 158 (e.g., water) can be introduced to be treated. Of note, the water treatment facility 140 may include a variety of other components that are non-essential to an understanding of implementing embodiments of the present invention. A sand filter is referenced hereinafter when discussing the filter medium 156, however, it is to be appreciated that other filters are contemplated and not outside a scope of the present invention. Further, although a closed basin is illustrated, it is to be appreciated that open basins may be implemented.

Embodiments of the drop test measuring system 100 can be implemented in a gravity sand filter. The gravity sand filter may implement further steps including a backwashing of the sand filter. The drop test measuring system 100 can be implemented to measure a velocity and/or flow rate of backwash to ensure a proper cleaning of the filter is completed.

The basin 150 can include, but is not limited to, a liquid inlet 152, a drain 154, a sand filter 156, and a liquid 158 being introduced via the inlet 152 into the basin 150 for treatment. The basin 150 can typically allow for the liquid 158 to flow through the sand filter 156 due to gravity. The liquid 158 can be pumped or introduced via gravity flow to the basin 150 and introduced into the basin 150 via the liquid inlet 152. In some instances, the basin 150 may be filled to a predetermined height or may be filled for a predetermined amount of time. As the liquid 158 enters the basin 150, the liquid can start to be passed through the sand filter 156 via gravity flow. After the flow of the liquid 158 into the basin 150 is stopped, the liquid level measuring system 100 can be implemented.

Referring to FIG. 2A, an example embodiment where a submersible pressure transducer is implemented as the liquid level measuring device 104 is illustrated. As shown, the liquid level measuring device 104 can be located proximate a top of the sand filter 156 and upstream of a gravity flow of the liquid 158 through the sand filter 156 in the basin 150. The control module 102 can be operatively connected to the liquid level measuring device 104 located in the basin 150. As previously mentioned, in some instances, the control module 102 may be located in the basin 150 with the liquid level measuring device 104. In other instances, the control module 102 may be located outside the basin 150 but still operatively connected to the liquid level measuring device 104. In some embodiments, the control module 102 and the liquid level measuring device 104 can be housed together.

Referring to FIG. 2B, an example embodiment where an ultrasonic level transmitter is implemented as the liquid level measuring device 104 is illustrated. As shown, the liquid level measuring device 104 can be located above a top of the liquid 158. Generally, the ultrasonic level transmitter may be placed as close to a top of the liquid 158 as possible without touching the liquid 158 when the basin 150 is full.

Referring to FIG. 2C, an example embodiment where a non-submersible pressure transducer is implemented as the liquid level measuring device 104 is illustrated. Typically, when a non-submersible pressure transducer is implemented, the non-submersible pressure transducer can be tapped into a pipe 105 that is open to the liquid in the basin 150 and can be located proximate a top of the sand filter 156 and upstream of a gravity flow of the liquid 158 through the sand filter 156. In some instances, the non-submersible pressure transducer may be directly tapped into the basin 150 at an appropriate location.

In embodiments where the liquid level measuring device 104 includes a pressure transducer, the pressure measured by the pressure transducer can be correlated to an overall depth of the liquid 158 in the basin 150. As can be appreciated, as the liquid 158 exits the basin 150, a pressure exerted on the pressure transducer would be reduced, thus indicating a lower liquid level.

The liquid level measuring device 104 can be configured to continuously send a signal to the control module 102. For instance, where a pressure transducer is implemented, an electrical signal can be generated and sent to the control module 102. The control module 102 can be configured to receive the signal from the liquid level measuring device 104, associate a timestamp with the signal when the signal is received, and convert the signal into data including the timestamp. In some instances, the control module 102 can be configured to determine when to store the data. For instance, the control module 102 may store the data based on time intervals. Typically, a range between every 1 second to every 5 minutes can be implemented. For example, pressure measurements every 5 seconds may be stored by the control module 102. In another example, pressure measurements every 10 seconds may be stored. In another instance, the control module 102 may store all data generated from the liquid level measuring device 104 and store that data. As previously mentioned, the control module 102 can convert a signal (e.g., electrical signal for a pressure transducer) into data that may be transmitted to the remotely located smart device 108.

Described hereinafter are example methods of implementing the drop test measuring system 100 where the liquid level measuring device 104 is a pressure transducer. These examples are not meant to be limiting.

In one example, a method of implementing the drop test measuring system 100 at the water treatment facility 140 including the basin 150 and the sand filter 156 can include the following steps. The liquid level measuring device 104 may be a submersible pressure transducer. First, the drop test measuring system 100 can be provided to the water treatment facility 140. Second, the liquid level measuring device 104 can be installed in the basin 150 at a location proximate to a top of the sand filter 156 and upstream of a gravity flow of a liquid through the sand filter 156. Third, the control module 102 can receive a first electrical signal related to a first pressure measurement from the pressure transducer of the liquid level measuring device 104. Fourth, the first electrical signal can be converted to a first data. The first data can include information related to the first pressure measurement and a time the pressure measurement was received. As previously mentioned, the control module 102 may associate a time stamp with when the electrical signal was received. Fifth, a second electrical signal related to a second pressure measurement from the pressure transducer 104 can be received. Sixth, the second electrical signal can be converted to a second data. The second data can include information related to the second pressure measurement and a time the second pressure measurement was received by the control module 102. Seventh, a first digital signal including the first data and the second data can be sent to the remotely located smart device 108. Finally, the smart device 108 can be implemented to calculate a first liquid level based on the first pressure measurement, a second liquid level based on the second pressure measurement. The smart device 108 may then calculate a flow rate of the liquid 158 through the sand filter 156 partially based on (a) the first liquid level, (b) the second liquid level, (c) the time the first pressure measurement was received, and (d) the time the second pressure measurement was received. Of note, the control module 102 may continue to receive electrical signals from the liquid level measuring device 104 and converting those electrical signals to data. The data may be continuously sent to the smart device 108 and an updated flow rate may be calculated based on the new data.

In another example, a method of implementing the drop test measuring system 100 at the water treatment facility 140 can include, but is no limited to, the following steps. First, the drop test measuring system 100 can be provided to the water treatment facility 140. Second, the liquid level measuring device 104 can be installed in the basin at a location proximate to a top of the sand filter 156 and upstream to a gravity flow of a liquid through the sand filter 156. Third, a continuous electrical signal can be sent from the pressure transducer to the control module 102. The electrical signal can be related to a pressure measurement of the liquid 158 inside the basin 150. Fourth, at predetermined time intervals, the control module 102 can convert the electrical signal to data. The data can include information related to a pressure measurement and a timestamp indicating the time the electrical signal was received by the control module. Fifth, the control module 102 can continuously send a digital signal including the data to the remotely located smart device 108. Finally, the smart device 108 can continuously calculate a current flow rate based partially on (i) a first liquid level based on a pressure measurement having an earlier timestamp, (ii) a successive liquid level based on a pressure measurement having a later timestamp, and (iii) a difference in time between the earlier timestamp and the later timestamp.

In one example, a method of implementing the drop test measuring system 100 at the water treatment facility 140 during a cleaning process can include, but is not limited to, the following steps. First, the drop test measuring system 100 can be provided to the water treatment facility 140. Second, the liquid level measuring device 104 can be installed in the basin at a location proximate to a top of the sand filter 156 and upstream of a gravity flow of a liquid through the sand filter 156. As can be appreciated, during a backwash, a flow of a liquid will be opposite to the gravity flow of the liquid during normal operation. Third, a continuous electrical signal can be sent from the pressure transducer to the control module 102. The electrical signal can be related to a pressure measurement of a liquid filling the basin 150 after passing in reverse through the sand filter 156. Fourth, at predetermined time intervals, the control module 102 can convert the electrical signal to data. The data can include information related to a pressure measurement and a timestamp indicating the time the electrical signal was received by the control module. Fifth, the control module 102 can continuously send a digital signal including the data to the remotely located smart device 108. Finally, the smart device 108 can continuously calculate a current flow rate of the backwash based partially on (i) a first liquid level based on a pressure measurement having an earlier timestamp, (ii) a successive liquid level based on a pressure measurement having a later timestamp, and (iii) a difference in time between the earlier timestamp and the later timestamp.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A method of implementing a drop test measuring system at a water treatment facility implementing a sand filter in a basin, the method comprising:
    providing a drop test measuring system, the system including:
        a control module; and
        a liquid level measuring device operatively connected to the control module, the liquid level measuring device consisting of a pressure transducer;
    placing the liquid level measuring device in the basin at a location proximate to a top of the sand filter and upstream of a gravity flow of a liquid through the sand filter;
    receiving a first electrical signal related to a first pressure measurement from the pressure transducer;
    converting the first electrical signal to a first data, the first data including information related to the first pressure measurement and a time the pressure measurement was received;
    receiving a second electrical signal related to a second pressure measurement from the pressure transducer;
    converting the second electrical signal to a second data, the second data including information related to the second pressure measurement and a time the second pressure measurement was received;
    sending a first digital signal including the first data and the second data to a remotely located smart device; and
    calculating (i) a first liquid level based on the first pressure measurement, (ii) a second liquid level based on the second pressure measurement, and (iii) a first flow rate through the sand filter based on (a) the first liquid level, (b) the second liquid level, (c) the time the first pressure measurement was received, and (d) the time the second pressure measurement was received.

2. The method of claim 1, wherein the smart device is preprogrammed with information about the water treatment facility, the sand filter, and dimensions of the basin.

3. The method of claim 1, the method further including the steps of:
  receiving a third electrical signal related to a third pressure measurement from the pressure transducer;
  converting the third electrical signal to a third data, the third data including information related to the third pressure measurement and a time the third pressure measurement was received;
  sending a second digital signal including the third data to the remotely located smart device; and
  calculating (i) a third liquid level based on the third pressure measurement, and (ii) a second flow rate through the sand filter based on (a) the third liquid level, (b) the second liquid level, (c) the time the third pressure measurement was received, and (d) the time the second pressure measurement was received.

4. The method of claim 3, the method further including the steps of:
  receiving a fourth electrical signal related to a fourth pressure measurement from the pressure transducer;
  converting the fourth electrical signal to a fourth data, the fourth data including information related to the fourth pressure measurement and a time the fourth pressure measurement was received;
  sending a third digital signal including the fourth data to the remotely located smart device; and
  calculating (i) a fourth liquid level based on the fourth pressure measurement, and (ii) a third flow rate through the sand filter based on (a) the third liquid level, (b) the fourth liquid level, (c) the time the third pressure measurement was received, and (d) the time the fourth pressure measurement was received.

5. The method of claim 1, wherein the control module consists essentially of:
  a processor;
  a nonvolatile storage;
  random-access memory;
  a network interface; and
  a device interface.

6. The method of claim 1, the method further including the step of:
  comparing the first flow rate to an upper and lower boundary of an acceptable flow rate through the sand filter.

7. The method of claim 6, the method further including the step of:
  determining the sand filter needs maintenance when the first flow rate is outside the upper or lower boundary of the acceptable flow rate.

8. The method of claim 1, the method further including the steps of:
  continuously calculating a new flow rate upon receiving new digital signals from the control module;
  comparing the new flow rate to an upper and lower boundary of an acceptable flow rate through the sand filter; and
  determining the sand filter needs maintenance when the new flow rate is outside the upper or lower boundary of the acceptable flow rate.

9. The method of claim 1, the method further including the steps of:
  continuously calculating a new flow rate upon receiving new digital signals from the control module;
  storing the newly calculated flow rates;
  generating a graphical display of the newly calculated flow rates; and
  updating the graphical display when new flow rates are calculated.

10. A method of implementing a drop test measuring system at a water treatment facility implementing a sand filter in a basin, the method comprising:
  providing a drop test measuring system, the system consisting of:
    a control module; and
    a liquid level measuring device operatively connected to the control module, the liquid level measuring device including a pressure transducer;
  placing the liquid level measuring device in the basin at a location proximate to a top of the sand filter and upstream of a gravity flow of a liquid through the sand filter;
  receiving a continuous electrical signal from the pressure transducer, the electrical signal related to a pressure measurement;
  at predetermined time intervals, converting the electrical signal to data, the data including information related to a pressure measurement and a timestamp indicating the time the electrical signal was received;
  continuously sending a digital signal including the data to a remotely located smart device; and
  continuously calculating a current flow rate based partially on (i) a first liquid level based on a pressure measurement having an earlier timestamp, (ii) a successive liquid level based on a pressure measurement having a later timestamp, and (iii) a difference in time between the earlier timestamp and the later timestamp.

11. The method of claim 10, wherein the first timestamp is within a predetermined range of the second timestamp.

12. The method of claim 11, wherein the predetermined range is 1 to 6 seconds.

13. The method of claim 11, wherein the predetermined range is 1 to 10 seconds.

14. The method of claim 11, wherein the predetermined range is 1 second to 5 minutes.

15. The method of claim 10, wherein the control module includes information about dimensions of the basin and a range of acceptable flow rates through the sand filter in the data sent to the smart device.

16. The method of claim 10, wherein the smart device is preprogrammed with information about dimensions of the basin and a range of acceptable flow rates through the sand filter.

17. The method of claim 10, the method further including the steps of:
  generating a graphical display of the calculated flow rate; and
  updating the graphical display when new flow rates are calculated.

18. The method of claim 10, wherein the pressure transducer is submerged in a liquid in the basin.

19. The method of claim 10, wherein the control module is located outside of the liquid.

20. A method of implementing a drop test measuring system in a basin of a water treatment facility implementing a sand filter, the method comprising:
  by a user, installing a pressure transducer in the basin at a location proximate to a top of the sand filter and upstream of a gravity flow of a liquid through the sand filter;
  by a user, operatively connecting the pressure transducer to a control module, the control module in wireless communication with a remotely located smart device;

by the control module, receiving a continuous electrical signal from the pressure transducer, the electrical signal related to a pressure measurement;

by control module, at predetermined time intervals, converting the electrical signal to data, the data including information related to a pressure measurement and a timestamp indicating the time the electrical signal was received;

by the control module, continuously sending a digital signal including the data to a remotely located smart device; and by the smart device, continuously calculating a current flow rate based partially on (i) a first liquid level based on a pressure measurement having an earlier timestamp, (ii) a successive liquid level based on a pressure measurement having a later timestamp, and (iii) a difference in time between the earlier timestamp and the later timestamp.

\* \* \* \* \*